(12) United States Patent
Terashima

(10) Patent No.: US 7,171,804 B2
(45) Date of Patent: Feb. 6, 2007

(54) EXHAUST SYSTEM FOR MULTI-CYLINDER ENGINE, AND STRADDLE-TYPE VEHICLE PROVIDED WITH SAME

(75) Inventor: Yasuto Terashima, Iwata (JP)

(73) Assignee: Yamaha Hatsudoki Kabushiki Kaisha, Shizuoka (JP)

( * ) Notice: Subject to any disclaimer, the term of this patent is extended or adjusted under 35 U.S.C. 154(b) by 27 days.

(21) Appl. No.: 10/923,281

(22) Filed: Aug. 20, 2004

(65) Prior Publication Data

US 2005/0039448 A1   Feb. 24, 2005

(30) Foreign Application Priority Data

Aug. 20, 2003   (JP)   ............... 2003-295804

(51) Int. Cl.
*F01N 7/10*   (2006.01)
(52) U.S. Cl. .................. 60/323; 60/312; 60/313; 60/324
(58) Field of Classification Search ............... 60/312, 60/313, 314, 323, 324
See application file for complete search history.

(56) References Cited

U.S. PATENT DOCUMENTS

| | | | | |
|---|---|---|---|---|
| 4,785,626 A | * | 11/1988 | Shiraishi | ............... 60/313 |
| 4,795,420 A | * | 1/1989 | Sakurai et al. | ............... 60/313 |
| 4,869,063 A | * | 9/1989 | Sakurai et al. | ............... 60/313 |
| 4,939,898 A | * | 7/1990 | Ichimura et al. | ............... 60/274 |
| 4,999,999 A | * | 3/1991 | Takahashi et al. | ............... 60/313 |
| 6,655,134 B2 | * | 12/2003 | Nakayasu et al. | ............... 60/324 |

FOREIGN PATENT DOCUMENTS

| | | |
|---|---|---|
| JP | 64-15428 | 1/1989 |
| JP | 2002-138828 | 5/2002 |

* cited by examiner

*Primary Examiner*—Binh Q. Tran
(74) *Attorney, Agent, or Firm*—Knobbe, Martens, Olson & Bear, LLP

(57) ABSTRACT

An exhaust system for a multi-cylinder engine can include a plurality of exhaust pipes with first upstream ends connected to exhaust openings of a multi-cylinder engine, and a collecting pipe connected to the second downstream ends of the exhaust pipes for collecting exhaust introduced from the exhaust pipes and directing it to a silencer. The collecting pipe has a front-end portion communicated to exhaust passages of the exhaust pipes, a middle portion for collecting the exhaust introduced from the front-end portion, and a rear-end portion for further collecting the exhaust introduced from the middle portion. The middle portion is provided with exhaust control means for controlling the area of the exhaust passages in accordance with engine speed.

11 Claims, 18 Drawing Sheets

EXHAUST SYSTEM FOR MULTI-CYLINDER ENGINE, AND STRADDLE-TYPE VEHICLE PROVIDED WITH SAME

PRIORITY INFORMATION

This application is based on, and claims priority to, Japanese Patent Application No. 2003-295804, filed Aug. 20, 2003, the entirety of which is expressly incorporated by reference herein.

BACKGROUND OF THE INVENTIONS

1. Field of the Inventions

The present inventions relate to an exhaust system for a multi-cylinder engine powering a straddle-type vehicle, and in particular, exhaust systems that are adapted to control the area of exhaust passages in accordance with engine conditions.

2. Description of the Related Art

In four-stroke engines, two-stroke engines and the like, it is known that opening and closing of an exhaust valve introduces exhaust into an exhaust pipe intermittently, where an inertia effect and a pulsation effect of the exhaust are produced. These effects (hereinafter called a "dynamic effect") change in accordance with engine conditions (mainly engine speed).

Therefore, maximizing the dynamic effect to increase volumetric efficiency of the engine at a certain speed significantly reduces the volumetric efficiency at the other speeds due to the dynamic effect working in reverse. Thus, in the case that the features of an exhaust system (the length, diameter and the like of the exhaust pipe) are made so that a more optimal dynamic effect is produced in the high-speed range, a the significant reduction in torque (drop in torque) in the middle-speed range can arise.

Meanwhile, various proposals have been made to improve engine output in a way such that an exhaust control valve adapted to change the area of the exhaust passage is provided in the exhaust pipe, and the exhaust control valve is closed to reduce the area of the exhaust passage and eliminate the dynamic effect in the middle- and low-speed ranges with low volumetric efficiency.

For example, JP-A-Sho 64-15428 discloses an exhaust control system having two sets of exhaust control valves disposed non-coaxially and generally in parallel with each other at the ends of four exhaust pipes, and an interlock mechanism provided at the ends of shafts of the exhaust control valves (see JP-A-Sho 64-15428). When exhaust pressure is exerted on the exhaust control valves, rotational forces produced by the shafts of the exhaust control valves are cancelled through the interlock mechanism, thereby providing reduced load on a motor or the like. This allows reduction of power produced by the motor or the like for driving the exhaust control valves, thereby effecting its size reduction.

JP-A-2002-138828 discloses an exhaust control system for a motorcycle having four exhaust pipes connected into two and then into one, a connecting pipe connected to the front end of a silencer, and a valve mechanism (exhaust control valve) adapted to change the area of an exhaust passage in the connecting pipe, for controlling exhaust pulsation (see JP-A-2002-138828)

SUMMARY OF THE INVENTION

In the prior art exhaust control system having the two sets of exhaust control valves disposed non-coaxially and generally in parallel with each other at the downstream ends of the exhaust pipes, the exhaust control valves are arranged at the ends of the four exhaust pipes, generally in a shape of a square with a cross inside as viewed radially in section. The area of the exhaust passages of the four exhaust pipes is thus controlled by the two sets of exhaust control valves. Therefore, the housing for containing the exhaust control valves is increased in size, resulting in the increased number of parts.

In the prior art exhaust system having the valve mechanism (exhaust control valve) provided forwardly of the silencer, layout flexibility is improved; however, since the valve mechanism (exhaust control valve) is positioned away from the engine, the exhaust gas pressure is not sufficient to obtain the desired dynamic effect, thereby leaving opportunity for further improvement in performance.

In view of the foregoing, it is, therefore, an object of at least one of the present inventions to provide an exhaust system for a multi-cylinder engine capable of reducing the number of parts, increasing layout flexibility when the exhaust control valve is disposed below the engine, and improving engine performance in the low- and middle-speed ranges.

In at least one embodiment, an exhaust system for a multi-cylinder engine includes a plurality of exhaust pipes with first ends connected to exhaust openings of a multi-cylinder engine, and a collecting pipe connected to second ends of the exhaust pipes for collecting exhaust introduced from the exhaust pipes and directing it to a silencer. The collecting pipe includes a front-end portion communicated to exhaust passages of the exhaust pipes, a middle portion for collecting the exhaust introduced from the front-end portion, and a rear-end portion for further collecting the exhaust introduced from the middle portion. The middle portion being provided with an exhaust control module for controlling the area of the exhaust passages in accordance with engine conditions.

In such embodiments, exhaust from the plurality of exhaust pipes is collected together and then the amount of exhaust flow is controlled. Therefore, the number of parts of the exhaust control portion can be reduced, as compared with when the amount of exhaust flow is controlled at the ends of the exhaust pipes as in the prior art. Further, the area of the exhaust passages is controlled immediately before the exhaust pipe is collected into one. Therefore, the amount of exhaust flow can be controlled at a position where enough exhaust gas pressure is provided, as compared with when exhaust flow is collected into one and then controlled in the amount as in the prior art.

In some embodiments, the front-end portion is formed with at least four exhaust passages. The middle portion is formed with at least two exhaust passages. The rear-end portion is formed with a single exhaust passage. This configuration allows an arbitrary number of exhaust passages to be formed in the collecting pipe. Thus, the exhaust control system can be configured to have the exhaust passage of a 4-into-2-into-1 type or a 6-into-3-into-1 type, for example.

The exhaust control module can have an exhaust control valve, the opening of which can be controlled. Controlling the valve opening can change the area of the exhaust passages. This configuration does not require an interlock mechanism as in the prior art and allows the area of the exhaust passages to be controlled with a relatively simple construction.

The amount of exhaust flow can be controlled in the middle portion of the collecting pipe. Therefore, the area of the exhaust passages can be controlled by the single exhaust control valve, and the amount of exhaust flow can be controlled at a position where sufficient exhaust gas pressure is provided to achieve a desired dynamic effect.

The exhaust control module can have at least one detection device for detecting engine at least one condition (engine speed, for example), a control map for storing control patterns of the exhaust control valve in accordance with the output from the detection device, and a target value computing device for computing a target value of an exhaust control valve opening in relation to the engine conditions, based on the control pattern read from the control map reference device, as well as optionally, other devices and/or modules. The exhaust control module can be further provided with a current value detecting device for determining a current value of the exhaust control valve opening, and comparison and control devices for controlling driving devices of the exhaust control valve to bring the current value closer to the target value. This configuration can provide enhanced output characteristics in accordance with change in engine speed and allows appropriate control of the output characteristics.

In some embodiments, the exhaust system allows for a reduction in the number of parts of the exhaust control portion, as well as arrangement in reduced space in the vehicle. Therefore, vehicle's ground clearance, the size of an oil pan, and the rate of turn can be more optimized. Further, engine performance can be improved in the low- and middle-speed ranges.

DETAILED DESCRIPTION OF THE PREFERRED EMBODIMENT

Figure 1:
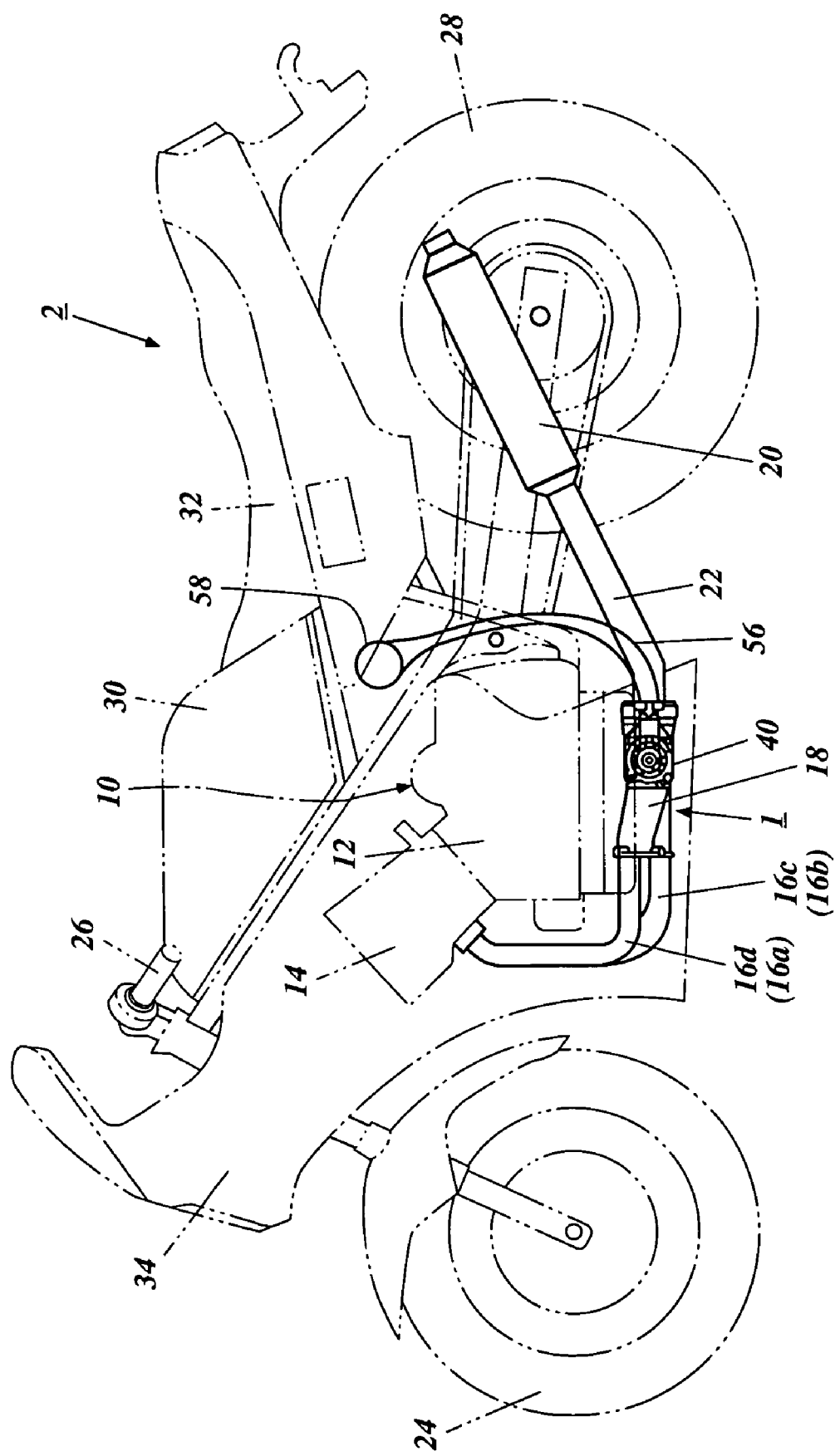
FIG. 1 shows an example of a straddle-type motorcycle 2 with an exhaust system 1 constructed in accordance with an embodiment.

With reference to the figures, preferred embodiments are described below in detail. FIG. 1 shows an example of one of straddle-type vehicle with which embodiments of the present inventions can be used, and in particular, a motorcycle 2, with an exhaust system 1 for a multi-cylinder engine.

As shown in FIG. 1, the motorcycle 2 has a front wheel 24, a steering handlebar 26, a rear wheel 28, a cover 30 for covering an intake cleaner and a fuel tank, a driver's seat 32 and a cowling 34. A four-stroke, four-cylinder engine 10 is located in the central portion of the body, however, other types of multi-cylinder engines can also be used. The engine 10 has a cylinder bank 14 extending obliquely upward toward the front from a crankcase 12, although other cylinder orientations can also be used. The exhaust system 1 extends from the cylinder bank 14 at the front side of the vehicle and is routed along under the engine 10.

Figure 2:
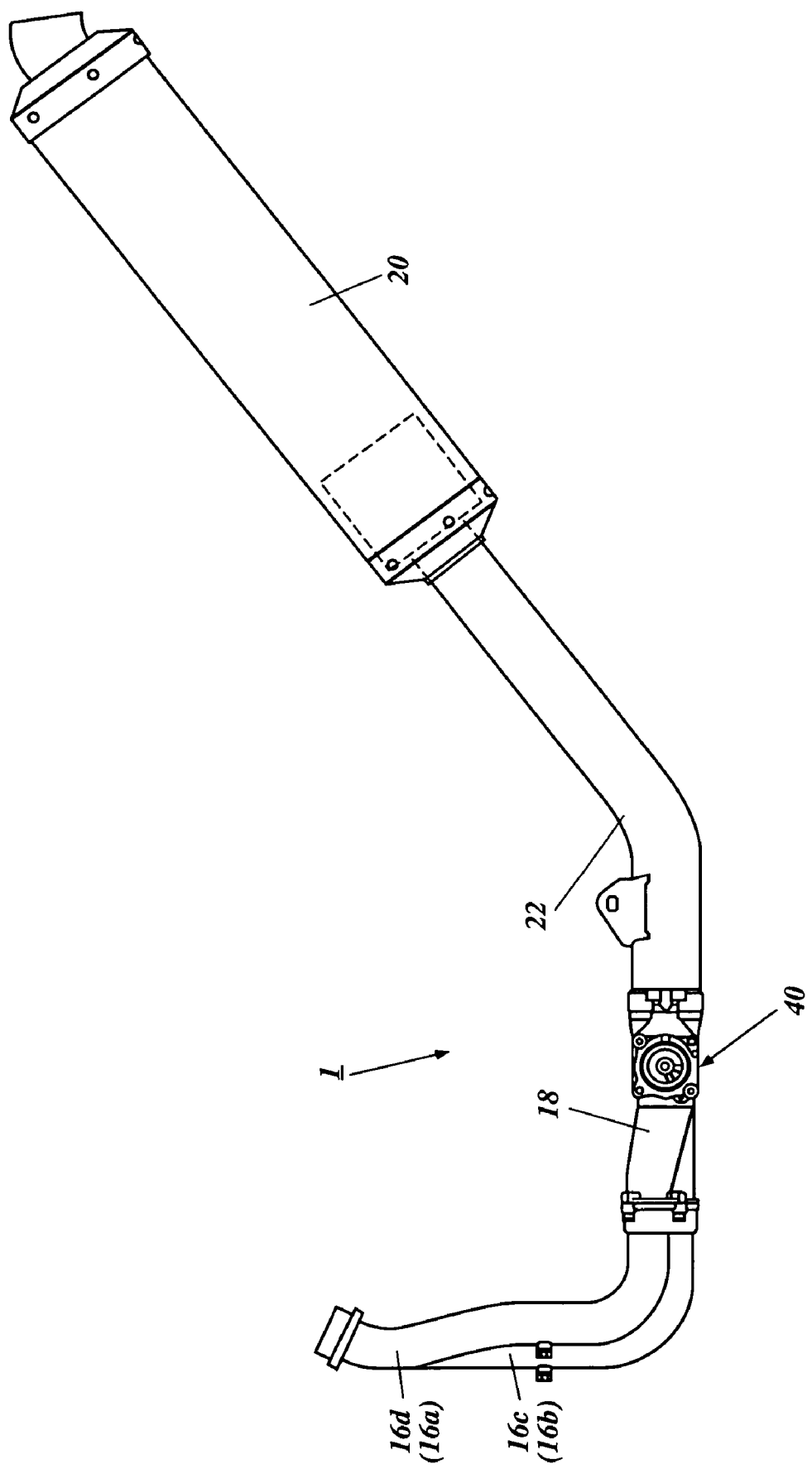
FIG. 2 is a left side view of the exhaust system 1 of FIG. 1.
Figure 3:
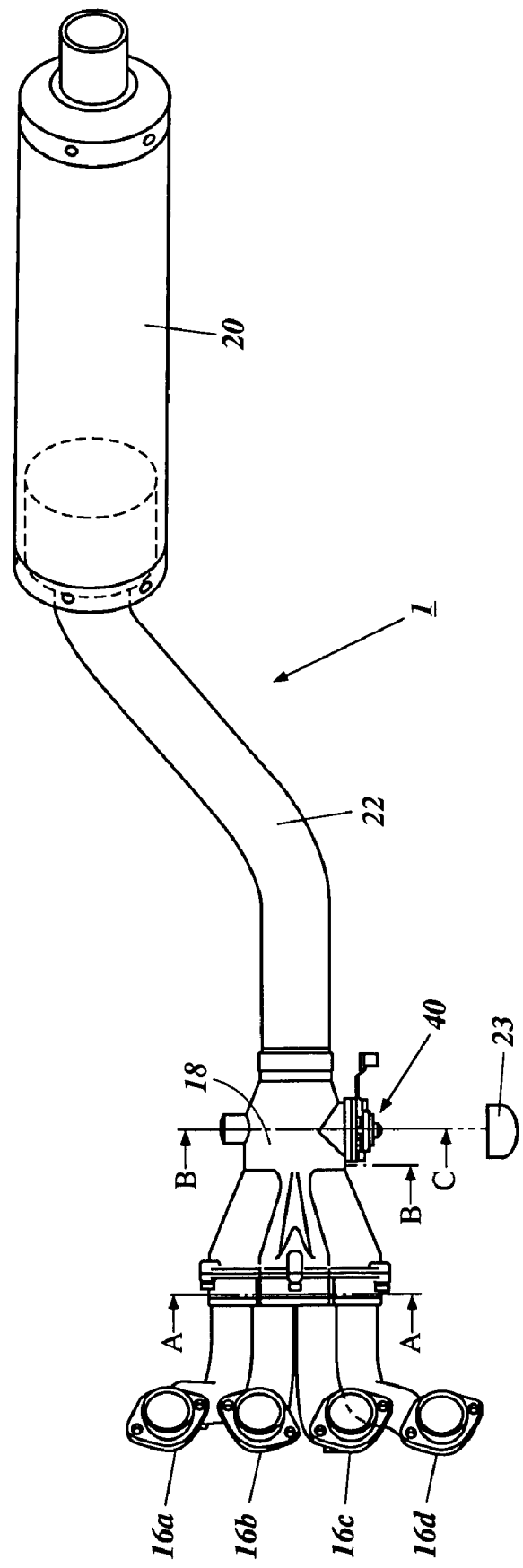
FIG. 3 is a plan view of the exhaust system 1 of FIG. 1.

An overall view of the exhaust system 1 is shown in FIG. 2 and FIG. 3. FIG. 2 is a left side view of the exhaust system 1 with respect to a running direction of the vehicle. FIG. 3 is a plan view of the exhaust system 1.

The exhaust system 1 has a plurality of exhaust pipes 16a to 16d with one ends connected to exhaust openings of the multi-cylinder engine 10 (see FIG. 1), and a collecting pipe 18 connected to the other ends of the exhaust pipes 16a to 16d for collecting the exhaust pipes. The collecting pipe 18 is connected to a connecting pipe 22 extending downstream and connected to a silencer 20. The collecting pipe 18 is provided with an exhaust control module, which can define an exhaust control means for controlling the area of exhaust passages. In the illustrated embodiment, the exhaust control module 40 comprises an exhaust control valve, described in greater detail below. A protecting cap 23 (See FIG. 3) is attached to the exhaust control module 40 to cover an end thereof.

Figure 4:
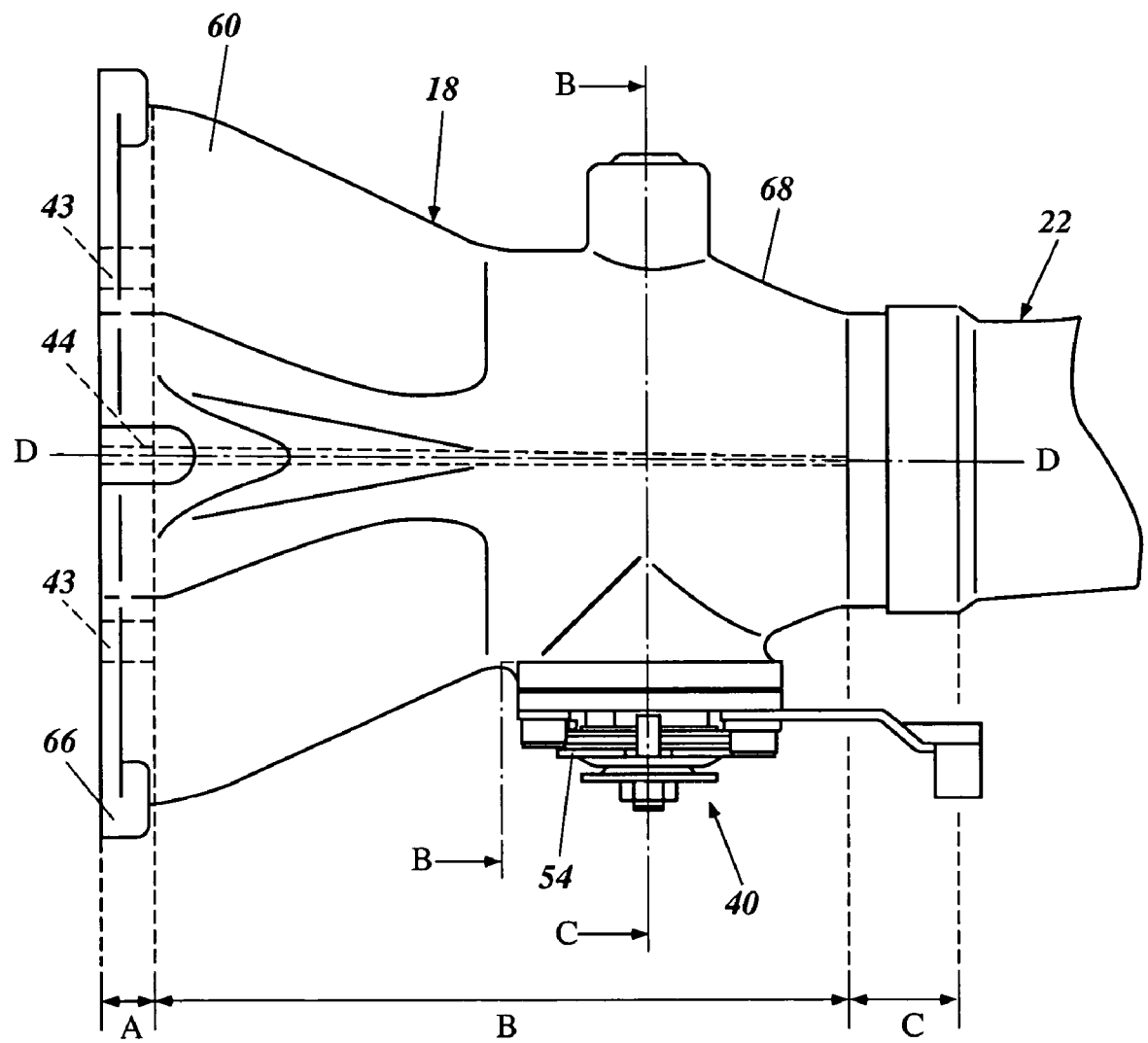
FIG. 4 shows, on an enlarged scale, an overall collecting pipe 18 and a portion of a connecting pipe 22 shown in FIG. 2 and FIG. 3.
Figure 5:
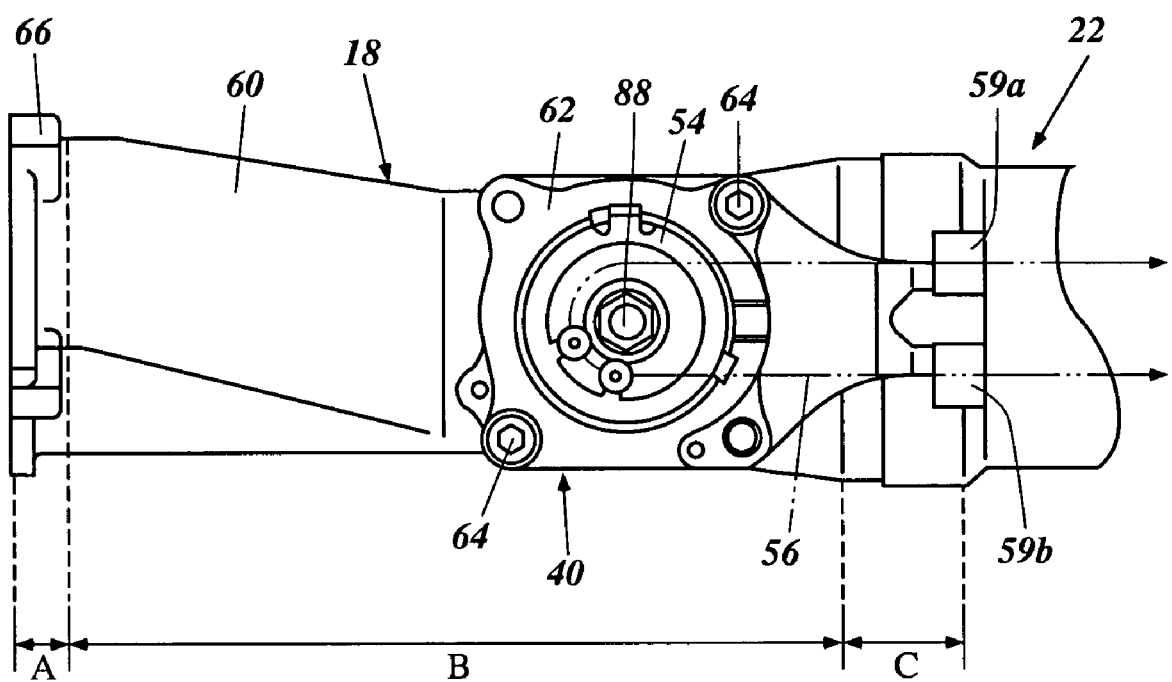
FIG. 5 shows, on an enlarged scale, the overall collecting pipe 18 and a portion of the connecting pipe 22 shown in FIG. 2 and FIG. 3.

FIG. 4 and FIG. 5 show, on an enlarged scale, the overall collecting pipe 18 and a portion of the connecting pipe 22 shown in FIG. 2 and FIG. 3. The collecting pipe 18 can be made of cast iron, connected thin plates or with titanium alloy through a lost wax method, however, other materials and/or methods of manufacture can also be used. The collecting pipe 18 can be connected to the exhaust pipes 16 by securing means such as bolts and to the connecting pipe 22 by joining means such as welding, although other devices and methods can also be used.

Figure 6:
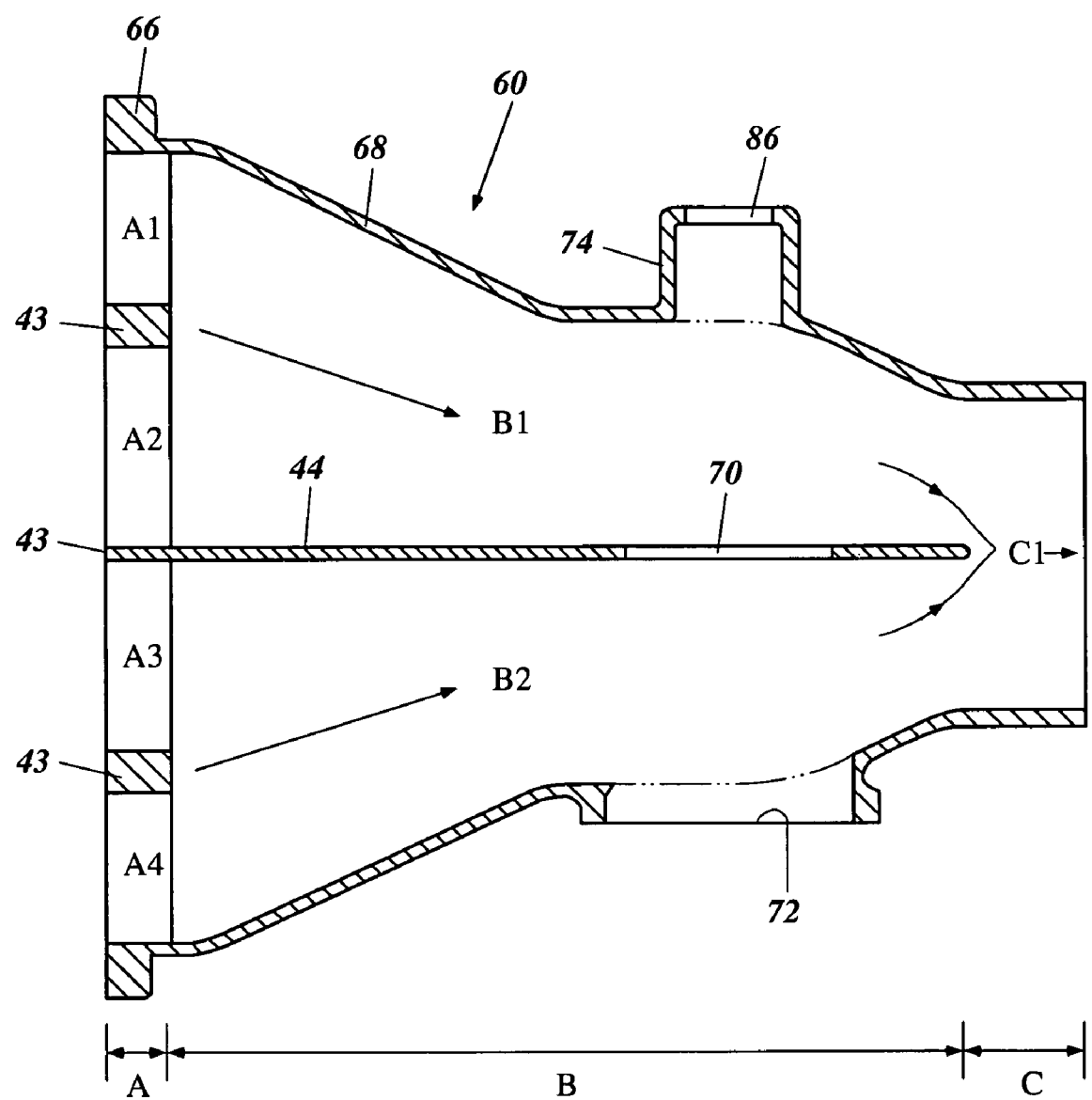
FIG. 6 is a horizontal sectional view of a housing 60 of FIG. 4.

The collecting pipe 18 can include a housing 60 with exhaust passages formed inside. A schematic sectional view of the housing 60 is shown in FIG. 6. The housing 60 can be divided in the direction along exhaust flow into three parts: a front-end portion (or inlet) A, a middle portion B and a rear-end portion (or outlet) C. In this embodiment, the number of exhaust passages in each of the portions A, B, C, is different.

Figure 7:
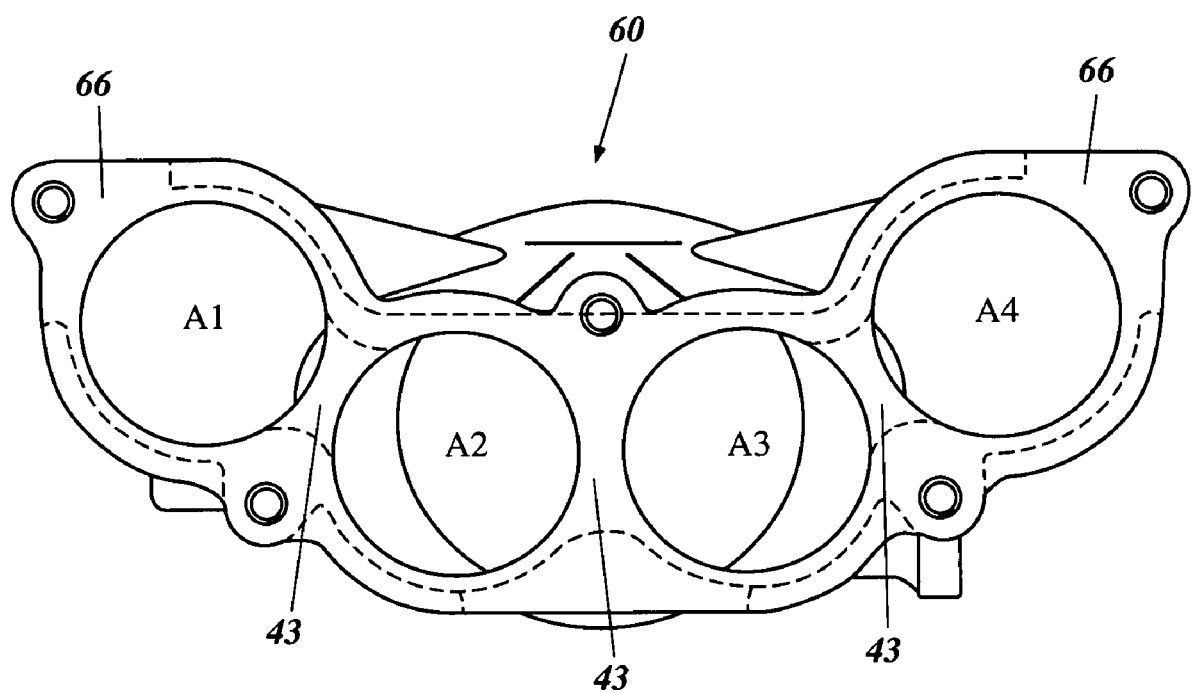
FIG. 7 shows the housing 60 as viewed from the front.

The front-end portion A has four exhaust passages A1 to A4 in line in the lateral direction of the vehicle (in the direction along a crankshaft of the engine 10) defined by partitions 43 and a partition plate 44. The housing can be a member defining a hollow shape having the partitions 43 to define the exhaust passages A1 to A4, as also shown in FIG. 7 and which also shows the housing 60 as viewed from the front.

The front-end portion A is formed with a flange 66, at its edge, for connecting with the exhaust pipes 16. The exhaust passages A1 to A4 of the front-end portion A are connected to the exhaust pipes 16a to 16d, respectively, and formed next to each other and generally in parallel. The exhaust passages A1 to A4 can also be arranged generally in a V-shape, as shown in FIG. 7.

As shown in FIG. 6, the middle portion B has two exhaust passages B1, B2 arranged side by side in the lateral direction of the vehicle defined by the partition wall 44. The exhaust passage B1 is a secondary exhaust passage merging together the exhaust passages A1, A2 of the front-end portion. The exhaust passage B2 is a secondary exhaust passage merging together the exhaust passages A3, A4 of the front-end portion. The exhaust passages B1, B2 of the middle portion B can each have a tapered portion 68 in profile defined by the outer periphery of the housing 60. The tapered portion 68 is formed in a sloping manner so as to gradually reduce an inside dimension of the housing 60 in the downstream direction of exhaust flow.

The partition plate 44 extends from the front-end portion A toward the vicinity of the forward end of the rear end portion C of the housing 60 along the center line of the housing 60, as shown in FIG. 6. The partition plate extends in the direction perpendicular to the cross section of FIG. 6 and can be formed integrally with the inner wall of the housing, although other constructions can also be used. The exhaust passage in the housing 60 is divided into the two exhaust passages B1, B2 in the region including the partition plate 44. The two exhaust passages B1, B2 finally join together between the rear end of the partition plate 44 and the rear end of the housing (in the region of the rear-end portion C of FIG. 6) into one, which is in turn connected to the connecting pipe 22 extending downstream (see FIG. 4 and FIG. 5).

Figure 10:
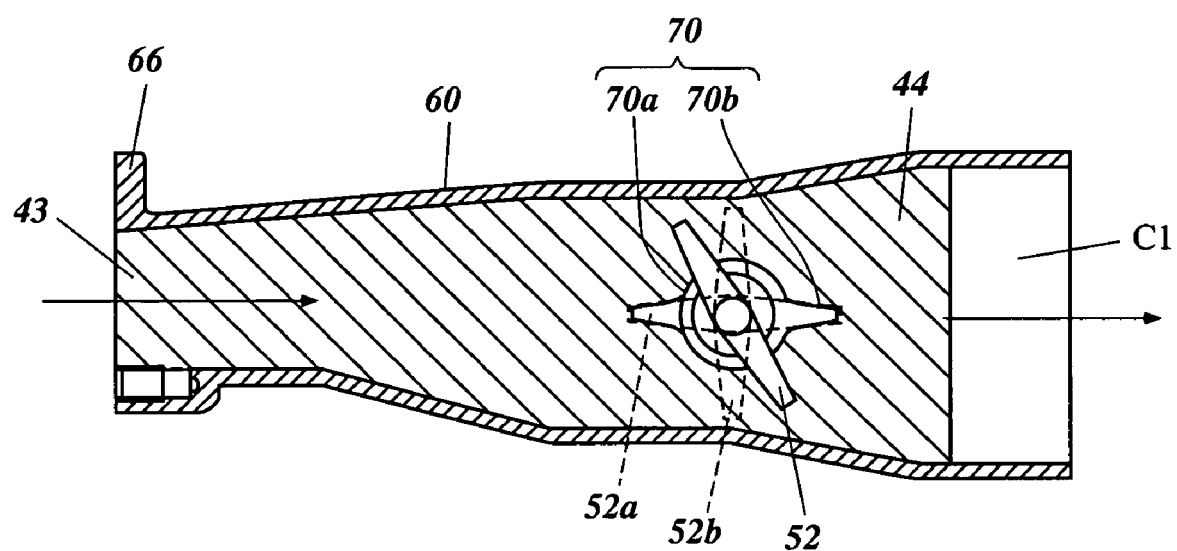
FIG. 10 is a sectional view taken along line D—D of FIG. 4.

As shown in FIG. 6 and FIG. 10, the partition plate 44 is configured to to permit an exhaust control valve 52, which is described below, to pass therethrough. In the illustrated embodiment, the plate 44 includes a notch 70 sized to accommodate the exhaust control valve 52. The notch 70 can include a circular hole 70a and an extended portion 70b extending from a portion of the hole 70a in a direction across its diameter, however, other configurations can also be used.

Figure 8:
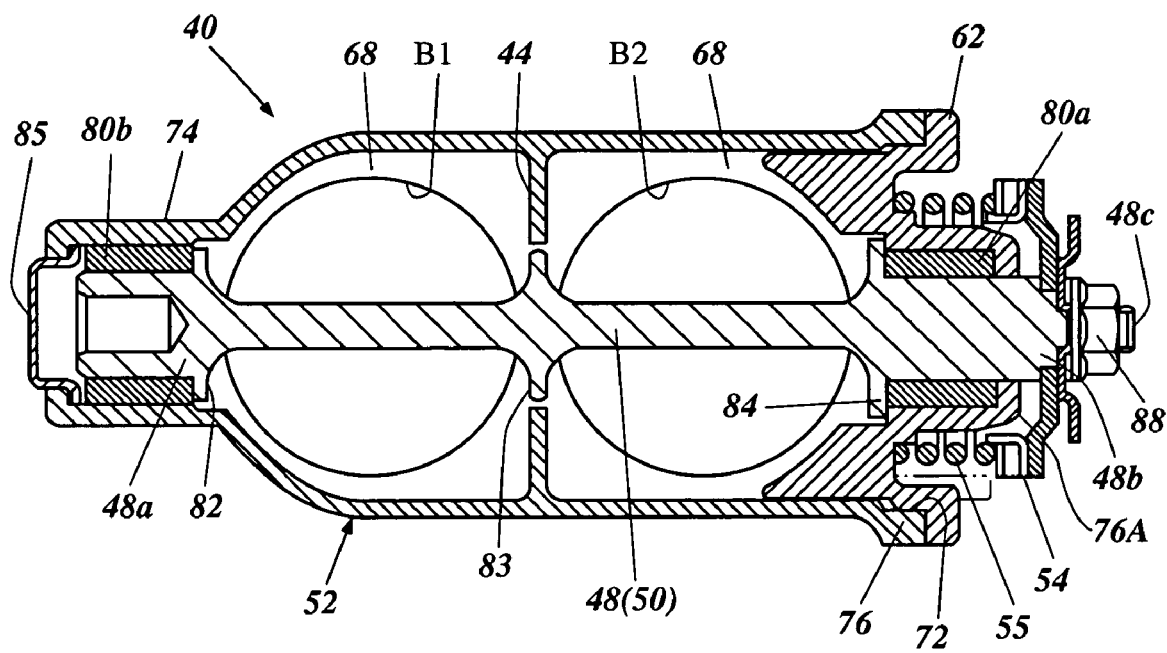
FIG. 8 is a sectional view taken along line B–C of FIG. 4, showing when an exhaust control valve 52 is fully opened.
Figure 9:
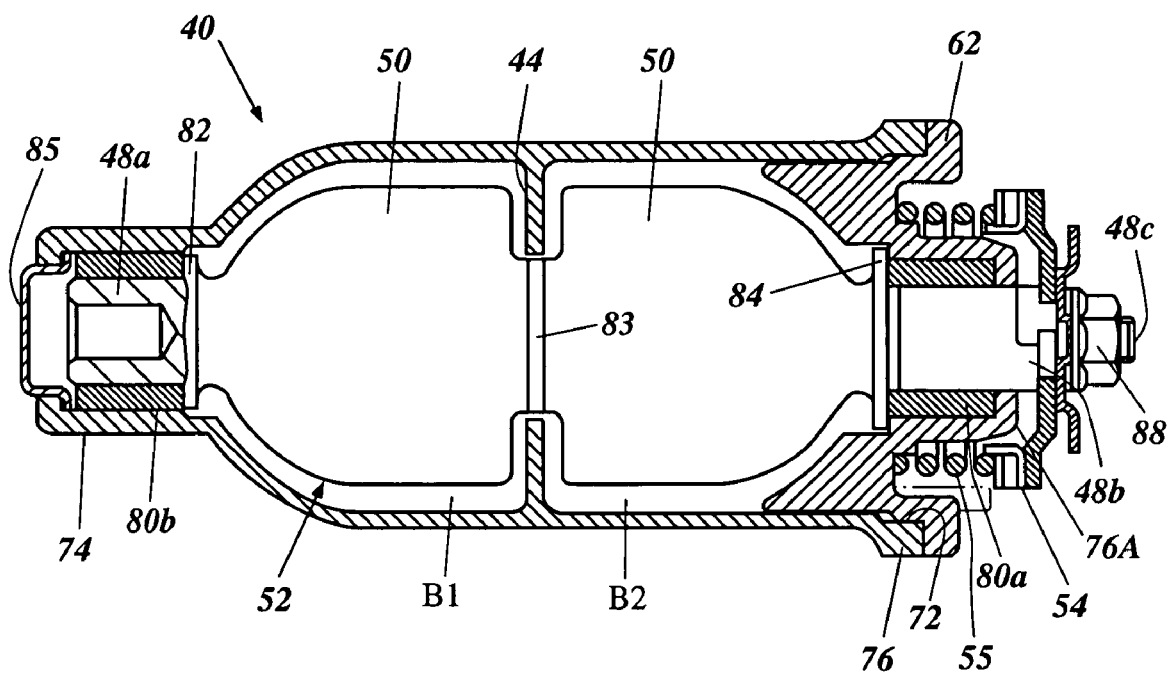
FIG. 9 is a sectional view taken along line B–C of FIG. 4, showing when the exhaust control valve 52 is fully closed.

The exhaust control module 40 can be disposed in the middle portion B of the housing 60. The housing 60, in the region of the middle portion B, can be formed with an opening 72 for removing the exhaust control valve 52 from the housing 60, as shown in FIG. 6, FIG. 8 and FIG. 9.

The region surrounding the opening 72 can be configured as a boss slightly projecting outward of the housing 60 to support a control valve unit. The outer peripheral edge, opposite the opening 72, of the housing 60 can be integrally formed with a boss portion 74 protruding outward of the housing 60 to support an end of the exhaust control valve 52. The boss portion 74 can project toward the right with respect to the moving direction of the motorcycle 2.

The rear-end portion C is not partitioned, as shown in FIG. 6, and is formed with a single exhaust passage C1. Since the housing 60 of the collecting pipe 18 is configured in such a manner as described, the flow of exhaust gas discharged from the engine 10 is directed to the collecting pipe 18 through the exhaust pipes 16a to 16d, runs through the exhaust passages A1 to A4 of the front-end portion A inside the collecting pipe 18 and then collected by the two exhaust passages B1, B2 of the middle portion B, as indicated in FIG. 6 by the arrow. The exhaust gas collected by the two exhaust passages B1, B2 is then collected by the single exhaust passage C1 of the rear end portion C and directed to the silencer 20 through the connecting pipe 22.

The exhaust control module 40 is further described below. FIGS. 8 and 9 are sectional views taken along line B–C of FIG. 4. The exhaust control module 40 includes the exhaust control valve 52. The control valve device includes a valve seat 62 secured to the boss portion 76 of the housing 60, a shaft 48 passing through the exhaust collecting pipe (the region B, see FIG. 6), and a rotor blade 50 provided on the shaft 48. The components of the exhaust control valve 52 are assembled beforehand into a unit. The control valve unit is mounted into the exhaust collecting pipe 18 in a way such that the valve seat 62 is secured with bolts 64 fitted in bolt holes formed in the valve seat 62 and the region surrounding the opening 72.

The valve seat 62 at its central portion includes a boss portion 76A protruding outwardly from the housing 60. The boss portion 76A can include a mechanism for supporting the shaft 48 of the exhaust control valve 52 for rotational movement. In the illustrated embodiment, the boss portion 76A is provided with a bearing 80a, in the inner peripheral region. The bearing 80a supports the shaft 48 for free or low friction rotational movement. When the shaft 48 is rotationally moved, the rotor blade 50 fixed thereon is rotationally moved together with the shaft 48, thereby providing for movement of the blade 50 to a desired angle with respect to the exhaust passages so that the exhaust passages B1, B2 are changed in terms of their cross-sectional flow area.

The exhaust control valve 52 can include a pulley 54 as a rotating member fixed to an end of the shaft 48 and rotatable about the axis of the shaft 48. A belt 56 (see FIG. 1 and FIG. 5) can be routed around the pulley and connected to a driving device 58 (see FIG. 1) for endlessly driving the belt 56. The driving device 58 can be a motor, such as a pulse motor, thereby providing a rotation means adapted to control the rotational angle of the rotor blade 50. The belt 56 is guided from the exhaust control module 40 below the engine to the driving device 58 above the exhaust control module 40 through guides 59a, 59b (see FIG. 5), as shown in FIG. 1.

The shaft 48 of the exhaust control valve 52 can be integrally provided with pressure receiving plates 82, 83, 84 projecting in the direction of the radius of the shaft 48, at the ends and the middle region, as shown in FIG. 8, FIG. 9, FIG. 11 and FIG. 12. The ends of the shaft 48 can also have radially projecting shaft end portions 48a, 48b. The shaft end portions 48a, 48b are each formed in a circular shape in section. The shaft end portion 48a at the opposite end of the shaft from the valve seat 62 is received in the boss portion 74 of the housing 60 via the bearing 80b, for rotational movement. Reference numeral 85 denotes a cover for covering the shaft end portion 48a.

Figure 11:
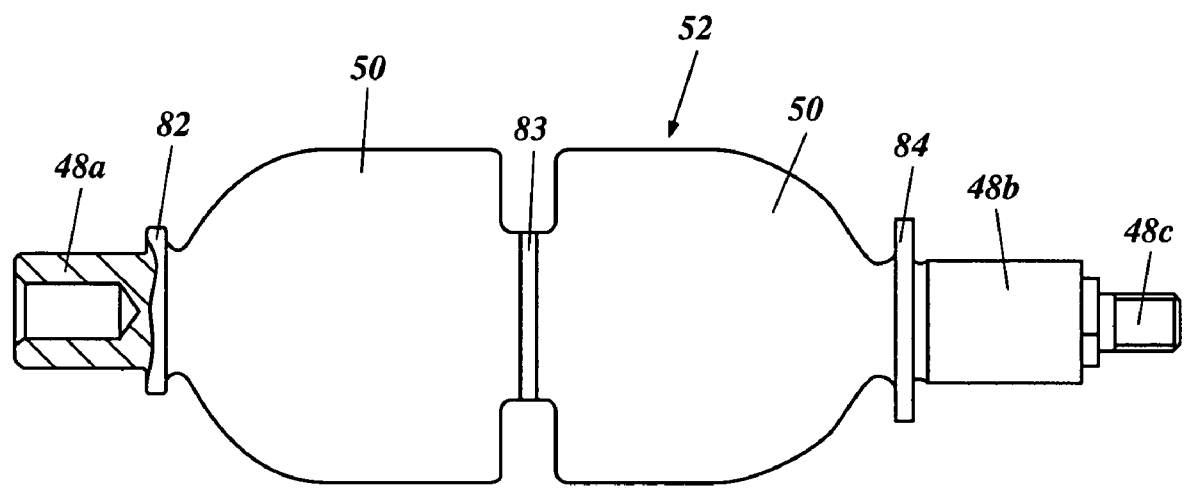
FIG. 11 is a plan view of the outer surfaces of the exhaust control valve 52 and including a partial section view.
Figure 12:
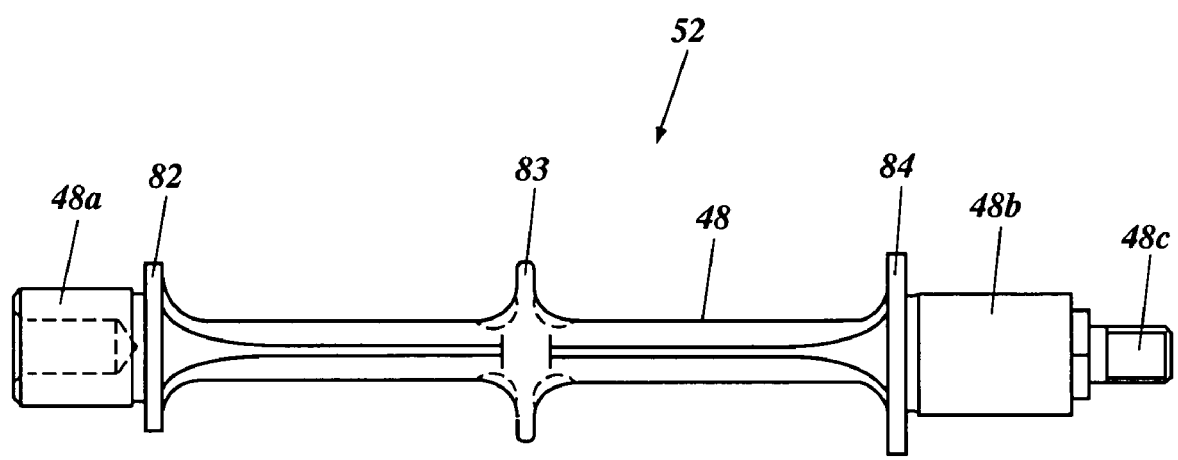
FIG. 12 is a front view of the exhaust control valve 52.

As shown in FIG. 11 and FIG. 12, a threaded shaft 48c projects from the shaft end portion 48b in the direction along its axis. The pulley 54 is inserted on the threaded shaft 48c and fastened to the threaded shaft 48c with a nut 88, as shown in FIG. 8 and FIG. 9. The driving mechanism such as a pulse motor permits the shaft 48 to rotate together with the pulley 54 by a controlled angle via the foregoing belt 56. Reference numeral 55 denotes a coil spring which presses the pulley 54 against the shaft 48. The coil spring provides improved sealing between the bearing 80a and the pressure receiving plate 84. The coil spring 55 can be seated in an accommodation hole formed in the valve seat 62. One end of the coil spring 55 is in contact with the valve seat 62, and the other, with the pulley 54. The pressure receiving plates 82 to 84 further define the exhaust passages B1, B2.

Figure 13:
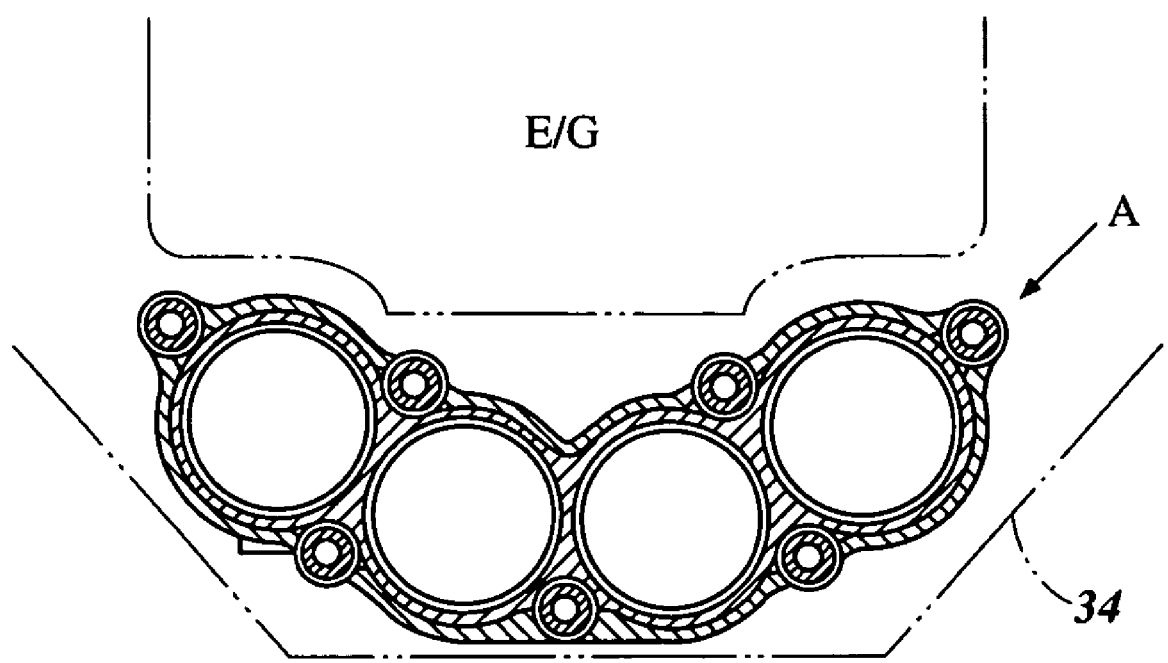
FIG. 13 is a sectional view taken along line A—A of FIG. 3, illustrating the motorcycle body with the exhaust system.
Figure 14:
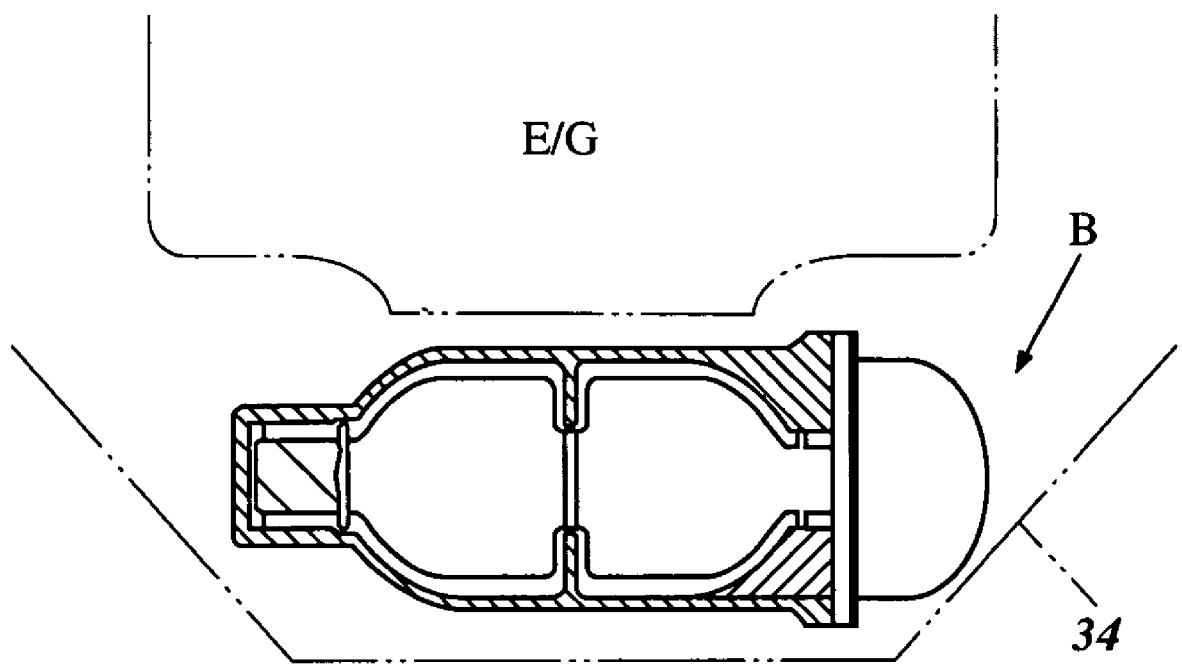
FIG. 14 is a sectional view taken along line B—B of FIG. 3, illustrating the motorcycle body with the exhaust system.

FIG. 13 is a sectional view taken along line A—A of FIG. 3. FIG. 14 is a sectional view taken along line B—B of FIG. 3. In these drawings, the front-end portion A and the middle portion B including the exhaust control module 40 of the collecting pipe 18 are positioned below the engine, and the cowling 34 is positioned below the collecting pipe 18, at the bottom, as shown by phantom lines. In this embodiment, the distance from the ground surface to the bottom of the cowling 34 shown by phantom lines defines the ground clearance of the motorcycle 2. The exhaust system of the present embodiment is adapted such that the area of the exhaust passages is controlled by the single exhaust control valve 52, thereby reducing the number of parts. This aids in improving the ground clearance of any vehicle using the exhaust system, as well as the size of an oil pan, and the rate of turn and layout flexibility is increased, when the exhaust control module 40 is disposed below the engine in the central portion of the body (see FIG. 14).

The exhaust valve 52 can be mounted into the housing 60 in the following steps. As shown in FIG. 8, the shaft 48, rotor blade 50, bearing 80a, valve seat 62, coil spring 55, pulley 54 and nut 88 can be pre-assembled together beforehand into a unit. When this unit is mounted into the housing 60, the shaft 48 is first inserted in the circular opening 70a formed in the housing, with the rotor blade and the extended portion 70b shown in FIG. 10 aligned with each other. Then, an end of the shaft is received in the bearing 80b disposed in the boss portion 74 of the housing, for free or reduced friction rotational movement, and the other end, in the boss portion 76 for free or reduced friction rotational movement.

Next will be described the rotational direction (opening direction) of the exhaust control valve 52. FIG. 8 shows when the exhaust control valve 52 is fully opened to the exhaust passages (in parallel with exhaust flow). When the shaft 48 is rotationally moved by 90 degrees from the illustrated position, the exhaust control valve is fully closed to the exhaust passages, as shown in FIG. 9. When the exhaust control valve is displaced from the fully opened position to the fully closed position, the rotor blade 50 of the exhaust control valve is rotationally moved clockwise as shown in FIG. 10. In FIG. 10, the exhaust control valve 52 when positioned between the fully opened position 52a and the fully closed position 52b is shown by solid lines.

When the exhaust control valve 52 is in the fully opened position (denoted by reference numeral 52a in FIG. 10), exhaust flows in the direction indicated by the arrow in FIG. 10 almost smoothly through a gap formed between the rotor blade 50 of the exhaust valve and the housing 60. When the exhaust control valve 52 is in the fully closed position (denoted by reference numeral 52b in FIG. 10), exhaust flow strikes against the rotor blade 50, which causes a negative pressure to be exerted in the direction opposite to the arrow, in accordance with an exhaust control valve 52 opening. When the exhaust control valve is in the fully closed position 52b, however, there is a gap left between the exhaust control valve and the housing 60, which is large enough for exhaust gas to pass therethrough.

Figure 15:
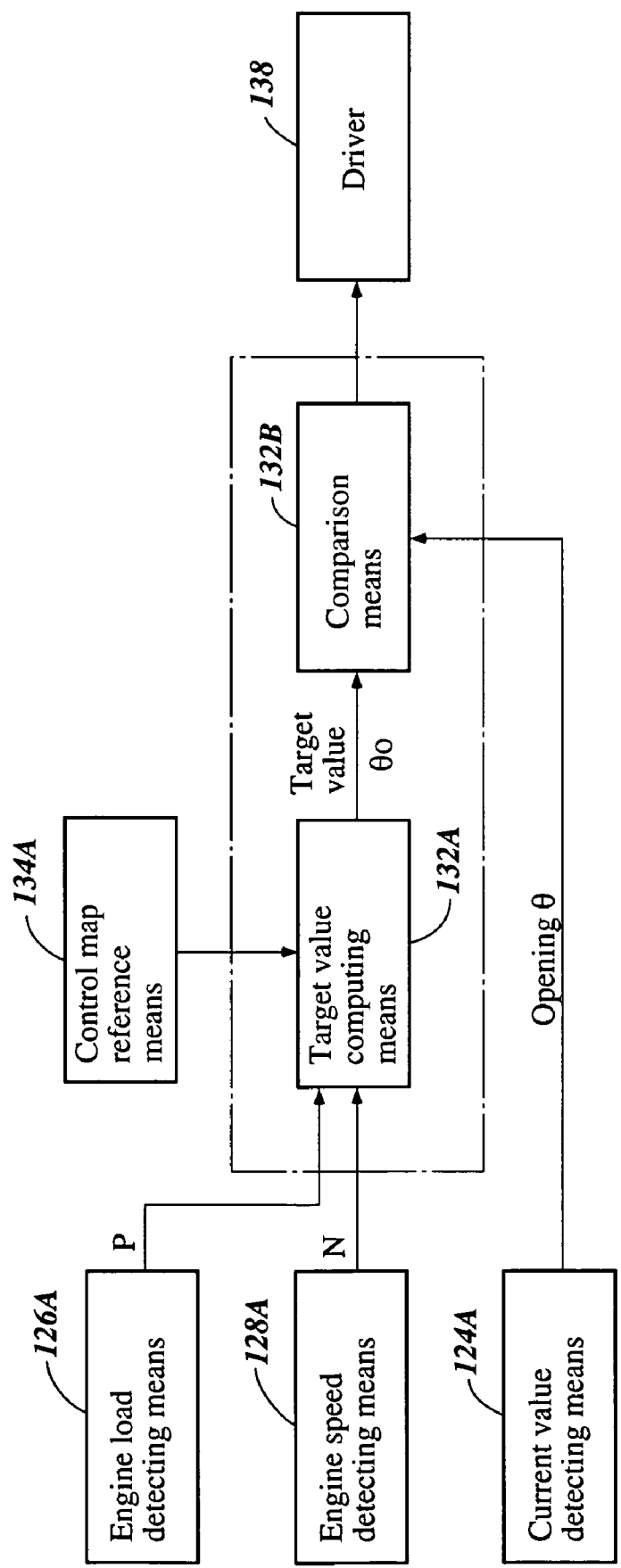
FIG. 15 is a functional block diagram of an exhaust control module 40.

Next will be described control of the exhaust control valve 52 opening. FIG. 15 is a functional block diagram of a control module which can define a portion of the exhaust control module 40. The control module can include a microcomputer, a sensor, the foregoing pulse motor and a pulse motor driver. The microcomputer can also include a control memory and a central processing unit.

The control module can include an engine load detector 126A, an engine speed detector 128A, a control map 134A, a target value computing device 132A, a current value detecting device 124A and a comparison device 132B. The engine speed detector 128A is configured to detect engine speed N. The control map 134A is configured to store a plurality of control patterns of the exhaust control valve 52. The target value computing device 132A is configured to compute a target value of an exhaust control valve 52 opening θ in relation to the engine speed, based on a control pattern that may be stored in the control map 134A. The current value detecting device 124A is configured to detect a current value of the exhaust control valve 52 opening θ. The comparison device 132B is configured to compare the target value and the current value. The output from the comparison device 132B can be supplied to a motor driving circuit 138.

This control module allows feedback control of the exhaust control valve opening θ. The valve opening θ can be detected and controlled based on an output value from a pulse motor encoder. It is to be noted that the control module can be in the form of a hard wired feedback control circuit, as schematically represented in FIG. 15. Alternatively, the control module can be constructed of a dedicated processor and a memory for storing a computer program configured to perform the exhaust valve control disclosed herein. Additionally, the control module can be constructed of a general purpose computer having a general purpose processor and the memory for storing the computer program for performing the exhaust valve control.

Figure 16:
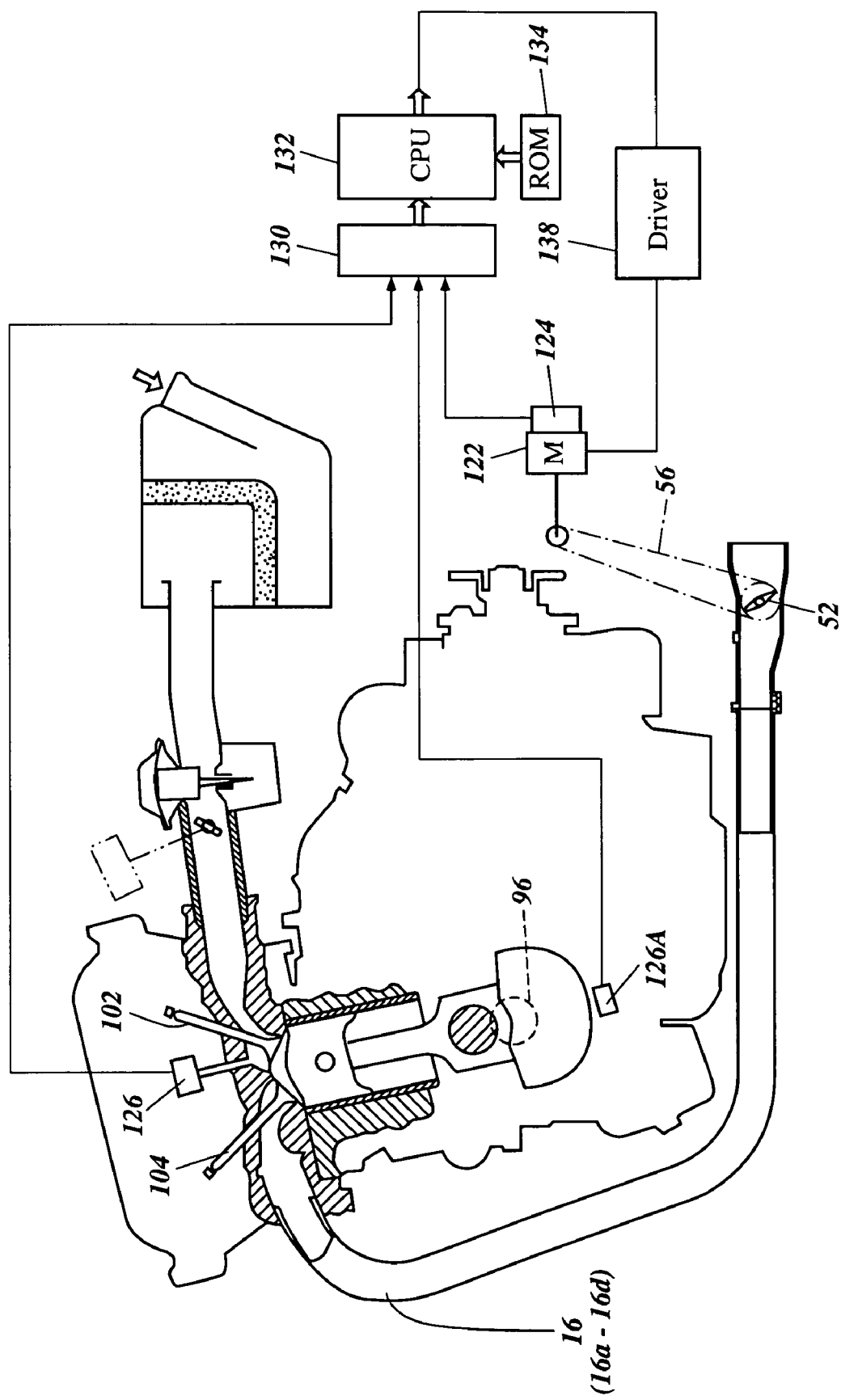
FIG. 16 is a schematic diagram showing an example of a motorcycle engine with the exhaust system provided with the exhaust control module 40.

FIG. 16 is a schematic diagram showing an example of a motorcycle engine with the exhaust control module. The exhaust pipes 16a to 16d are each connected to an exhaust opening of an exhaust valve 104. The downstream ends of the exhaust pipes are connected to the collecting pipe 18. The collecting pipe 18 is provided with the exhaust control valve 52.

When the exhaust control valve 52 is in the fully closed position (see FIG. 9), the area of the exhaust passages is reduced to about one-fourth of the total area of the exhaust passages B1, B2. The exhaust control valve 52 opening is set by a pulse motor (stepping motor) 122 as a driving device via the belt 56.

The engine speed N detected by a speed sensor 128, as well as a pulse value corresponding to the exhaust control valve 52 opening θ detected by a rotary encoder 124 of the pulse motor, is inputted to the central processing unit 132 via an A/D converter and an interface 130. The engine load detecting device denoted by reference numeral 126A can be a knock sensor, a throttle valve position sensor, or other devices, for example.

The CPU 132 controls the exhaust control valve 52 opening, that is, the effective cross sectional flow area of the exhaust passages B1, B2 in accordance with the engine conditions detected by the above-noted sensors, in a way such that engine operation produces more optimal output characteristics. For example, the more optimal control patterns of the exhaust control valve 52 in accordance with the engine conditions are stored as control maps in a ROM 134 (control map reference means 134A) beforehand. The target value computing device 132A, defined in part by the CPU 132, selects the optimal control pattern in accordance with the engine conditions such as the engine speed N. The target value computing device 132A then computes a target rotational angle value $\theta_0$ of the motor 122, which corresponds to the valve opening $\theta$, to achieve the desired cross sectional flow area of the exhaust passages for the current engine conditions, based on the selected control pattern. The other indicators of the engine conditions can include a detection value by an oxygen sensor 126 shown in FIG. 16. Reference numeral 102 denotes an intake valve.

As shown in FIG. 8 and FIG. 9, the pulley 54 is fixed to the threaded shaft 48c of the shaft end portion 48b of the valve shaft. Therefore, in this embodiment, the rotation of the pulley by the motor 122 via the belt 56 allows control of the area of the exhaust passages. For example, the exhaust control valve 52 is moved toward the closing direction when the engine 10 is running in a speed range with low volumetric efficiency. In contrast, the exhaust control valve 52 is moved toward the opening direction when the engine 10 is running in the other speed ranges, based on the engine speed detected by the speed sensor 128. Therefore, in the case that the diameter, length and or other dimensions of the exhaust pipe 16 are made so that volumetric efficiency of the engine is increased in the high-speed range, the control module causes the motor 122 to drive the exhaust control valve 52 to be closed when the engine is running in the low-speed range.

Figure 17:
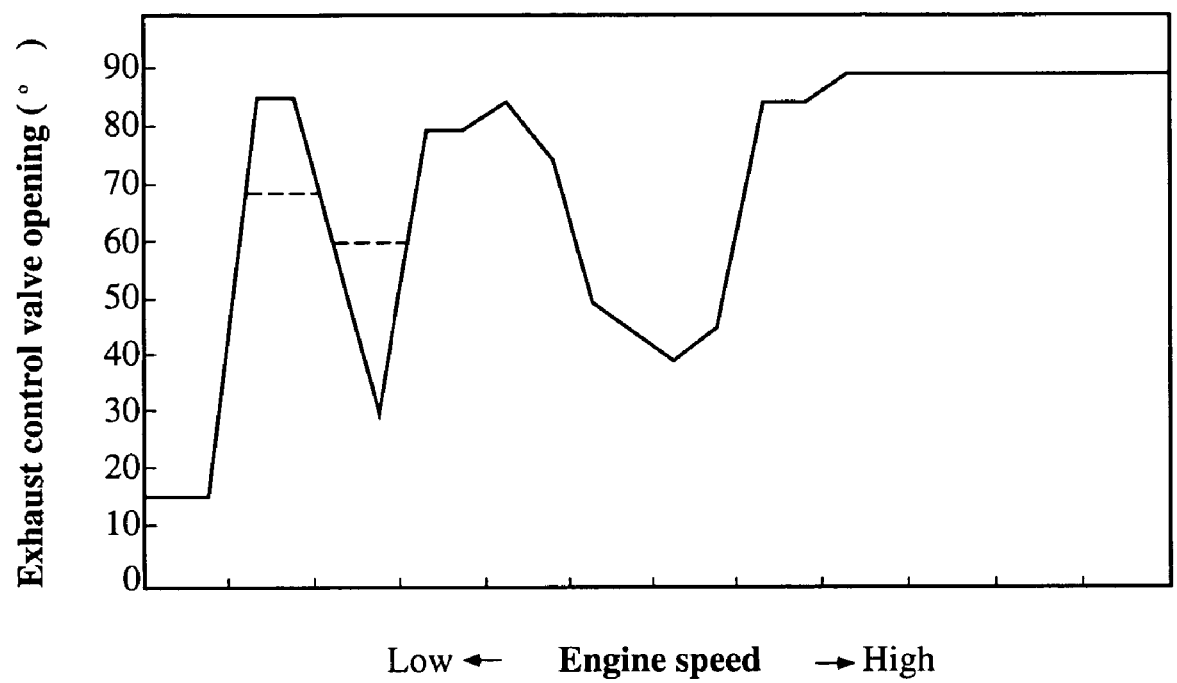
FIG. 17 includes a schematic representation of an exemplary relationship between engine speed and an exhaust control valve 52 opening.

FIG. 17 includes a graph showing an exemplary relation between engine speed and an exhaust control valve 52 opening during operation of some embodiments. In FIG. 17, the exhaust control valve 52 is fully closed when the exhaust control valve 52 opening is zero degrees, while the exhaust control valve 52 is fully opened when the exhaust control valve 52 opening is 90 degrees. The exhaust control valve 52 opening is, however, controlled when the engine is running in the low-speed range, as shown by broken lines in FIG. 17, in order to prevent a sharp increase in torque immediately after an engine start.

Figure 18:
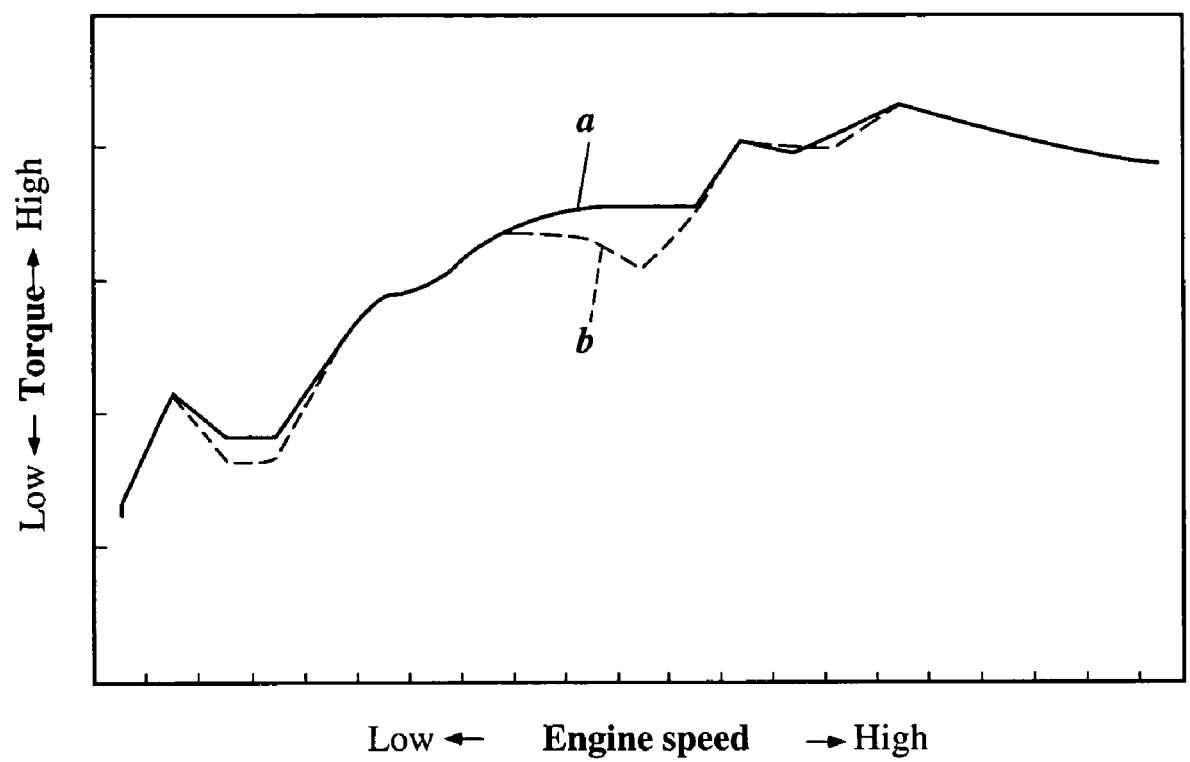
FIG. 18 includes a schematic representation of an exemplary relationship between engine speed and torque of an engine using the exhaust control module 40.

FIG. 18 shows the relation between engine speed and torque when the exhaust control valve 52 opening is controlled in accordance with control characteristics of FIG. 17. In FIG. 18, solid line a shows when the amount of exhaust flow is controlled by the exhaust system constructed in accordance with some embodiments. Broken line b shows when no amount of exhaust flow is controlled, for comparison. As is clear from FIG. 18, when the amount of exhaust flow is controlled (a), the reduction in volumetric efficiency (drop in torque) can be improved in the middle- and low-speed ranges, as compared with when no amount of exhaust flow is controlled (b).

The foregoing description has been made of the exhaust system having four, two and one exhaust passages provided for the front-end portion A, middle portion B and rear-end portion C of the collecting pipe 18, respectively. The description, however, is also applied to the exhaust system having six, three and one exhaust passages provided by the additional partition 43 and partition plate 44.

Although the present inventions have been disclosed in the context of certain preferred embodiments and examples, it will be understood by those skilled in the art that the present inventions extend beyond the specifically disclosed embodiments to other alternative embodiments and/or uses of the inventions and obvious modifications and equivalents thereof. In addition, while several variations of the inventions have been shown and described in detail, other modifications, which are within the scope of these inventions, will be readily apparent to those of skill in the art based upon this disclosure. It is also contemplated that various combination or sub-combinations of the specific features and aspects of the embodiments may be made and still fall within the scope of the inventions. It should be understood that various features and aspects of the disclosed embodiments can be combined with or substituted for one another in order to form varying modes of the disclosed inventions. Thus, it is intended that the scope of at least some aspect of some of the present inventions herein disclosed should not be limited by the particular disclosed embodiments described above, but should be determined only by a fair reading of the claims that follow.

What is claimed is:

1. An exhaust system for a multi-cylinder engine having a plurality of exhaust pipes with first ends connected to exhaust openings of a multi-cylinder engine, and a collecting pipe connected to second ends of the exhaust pipes for collecting exhaust introduced from the exhaust pipes and directing it to a silencer, the collecting pipe having:

a front-end portion communicating to at least four exhaust passages of the exhaust pipes;

a middle portion configured to merge the at least four exhaust passages into at least two merged exhaust passages and to collect exhaust introduced from the front-end portion; and a rear-end portion for further collecting the exhaust introduced from the middle portion, the middle portion being provided with an exhaust control module for controlling the area of the at least two merged exhaust passages in accordance with engine conditions.

2. The exhaust system for a multi-cylinder engine according to claim 1, wherein the rear-end portion is formed with a single exhaust passage.

3. The exhaust system for a multi-cylinder engine according to claim 1, wherein the exhaust control module has an exhaust control valve adapted to change the area of the at least two merged exhaust passages.

4. The exhaust system for a multi-cylinder engine according to claim 3, wherein the area of the exhaust passages is controlled by a single exhaust control valve.

5. The exhaust system for a multi-cylinder engine according to claim 3, wherein the exhaust control module comprises:

detection means for detecting engine conditions;

control map reference means for storing control patterns of the exhaust control valve; and target value computing means for computing a target value of an exhaust control valve opening in relation to the detection value of the engine conditions, based on the control pattern read from the control map reference means.

6. The exhaust system for a multi-cylinder engine according to claim 1, wherein the exhaust control module is disposed below a crankcase of the engine.

7. The exhaust system for a multi-cylinder engine according to claim 1, in combination with a straddle-type vehicle powered by the multi-cylinder engine.

8. The exhaust system for a multi-cylinder engine according to claim 1, wherein exhaust control module comprises a valve shaft extending laterally through both of the at least two merged passages and a valve body connected to the shaft and configured to adjust a respective cross section flow areas of both of the at least two merged passages.

9. The exhaust system for a multi-cylinder engine according to claim 1, wherein the multi-cylinder engine is a four-cylinder engine having four exhaust openings.

10. The exhaust system for a multi-cylinder engine according to claim 1, wherein the multi-cylinder engine is a six-cylinder engine having six exhaust openings.

11. The exhaust system for a multi-cylinder engine according to claim 1, wherein the at least two merged exhaust passages are separated from each other in the middle portion.

* * * * *